United States Patent [19]

Lassiter

[11] Patent Number: 4,929,579

[45] Date of Patent: May 29, 1990

[54] METHOD OF MANUFACTURING CAST FUSED SILICA ARTICLES

[75] Inventor: Perry B. Lassiter, Johnson City, Tenn.

[73] Assignee: Premier Refractories & Chemicals Inc., King of Prussia, Pa.

[21] Appl. No.: 366,295

[22] Filed: Jun. 13, 1989

Related U.S. Application Data

[63] Continuation of Ser. No. 212,825, Jun. 29, 1988, abandoned.

[51] Int. Cl.$^5$ ............................................. C04B 35/14
[52] U.S. Cl. ..................................... 501/133; 501/154
[58] Field of Search ............................... 501/133, 154

[56] References Cited

U.S. PATENT DOCUMENTS

| 4,018,615 | 4/1977 | Mills | 501/133 |
| 4,033,780 | 7/1977 | Baumgartner et al. | 501/133 |
| 4,047,966 | 9/1977 | Bihuniak et al. | 501/133 |
| 4,088,502 | 5/1978 | La Bar | 501/124 |
| 4,221,596 | 9/1980 | Rice | 501/133 |

OTHER PUBLICATIONS

Perry, Robert H. "Chemical Engineers' Handbook", 5th Edition, McGraw Hill, New York, pp. 11-27, 28 (1973).

Primary Examiner—Mark L. Bell
Assistant Examiner—Anthony J. Green
Attorney, Agent, or Firm—Ostrolenk, Faber, Gerb & Soffen

[57] ABSTRACT

A method of producing a cast fused silica product includes grinding fused silica particles to have a first particle size and to form an aqueous slurry. A fused silica aggregate is provided having a second particle size greater than the first particle size. A first amount of the aqueous slurry is dried to form dried fused silica particles and the dry fused silica particles are ground to have a third particle size intermediate to the first and second particles sizes. A second amount of the aqueous slurry, the fused silica aggregate and the ground fused silica particles are admixed to form a casting mix.

17 Claims, No Drawings

METHOD OF MANUFACTURING CAST FUSED SILICA ARTICLES

This is a continuation of co-pending application Ser. No. 07/212,825 filed on June 29, 1988, now abandoned.

BACKGROUND OF THE INVENTION

The present invention relates to the manufacture of refractory articles by casting a fused silica slurry into a mold to form a cast product which is subsequently dried and sintered and, more particularly, to a method of producing such a cast fused silica product having an increased density and reduced porosity whereby improved resistance to chemical attack by metals and slags is imparted to the resultant product.

In the production of metal articles from molten metal, such as aluminum and aluminum alloys, the metal is generally melted in a furnace and conveyed in troughs, lined with a refractory material having good resistance to attack by the molten metal, to a cold core also made of a refractory material having good resistance to attack by the molten metal. It is common practice in industry to form such troughs and molds out of a refractory material formed of fused silica, as, the resultant, cast fused silica is highly pure and will have good resistance to attack by molten metal.

One common method of producing such articles comprises casting a flowable aqueous slurry of fused silica into a plaster of paris mold to form a cast product. The aqueous fused silica slurry is subsequently dried and sintered to provide a resultant product having good resistance to attack by molten metal. The aqueous fused silica slurry is typically formed by subjecting a slurry of fused silica particles in water to wet grinding, typically in a ball mill, to produce an aqueous fused silica slurry wherein the fused silica particles have a particle size less than 325 mesh. Typically, the water content of the resultant fused silica slurry ranges from 18 to 20 percent. Aggregate fused silica particles, typically having a particle size range from −10 to +20 mesh (U.S. standard), are admixed into the aqueous fused silica slurry to increase the solids content of the resultant casting mix and to permit a lower porosity, higher density product to be obtained. It is a well known fact that the higher the water content in the casting mix, the higher the porosity and the lower the density of the resultant casted product. Therefore, it is well appreciated that when casting an aggregate mix, it is desirable to have the lowest possible water content in order to produce a product having high density and low porosity. However, it is also a known fact that if the casting mix contains too high a content of aggregate fused silica paticles, the casting mix becomes too sandy and will not flow properly, thereby, making mold filling difficult. Consequently, when using a high purity, fused silica slurry for casting such products, the density of the resultant article has been limited to approximately 120 pounds/cubic foot or less and the porosity of the resultant article has been limited to approximately 13% or more.

Accordingly, it is an object of the present invention to provide a method for producing, by casting, high purity fused silica articles having a density in excess of about 125 pounds/cubic foot and a porosity of less than about 10%; this density and porosity, and all density or porosity values referred to herein, being calculated in accordance with the procedures described at pages 31 and 32 of a book entitled "CERAMIC TESTS AND CALCULATIONS", by Andrew I. Andrews, published by John Wiley & Sons, 1950, 8th printing.

SUMMARY OF THE INVENTION

An improved method of producing a cast high purity fused silica article by admixing particles of fused silica aggregate and a flowable aqueous slurry of finer fused silica particles and pouring the admixture into a mold to form a cast product which is subsequently dried and sintered, the improvement comprising drying a portion of the aqueous fused silica slurry to yield a dry fused silica particulate, grinding the dried fused silica particulate, and adding the ground dried fused silica particulate to the admixture of the fused silica slurry and the fused silica aggregate prior to or during the pouring of the admixture into the mold. It has been found that adding the ground dried fused silica particulate permits the lowering of the water content of the slurry, thereby, resulting in a product having a lower porosity and a higher density while not adversely effecting the flowability of the casting mix.

Preferably, the ground dry fused silica particulate is added to the admixture of the fused silica slurry and the fused silica aggregate in an amount so as to constitute from about 5 to 15 percent by weight of the resultant mixture, the fused silica slurry constitutes from 40 to about 50 percent by weight of the resultant mixture, and the fused silica aggregate constitutes from about 40 to about 50 percent by weight of the resultant mixture.

DESCRIPTION OF THE INVENTION

A fused silica article of the high silica purity was produced from a fused silica slurry by conventional casting methods with the exception that a portion of fused silica slurry was first dried to form dry fine fused silica particles the dried fine fused silica particles were ground and the resultant ground, dried fine fused silica particles were then resultant mixture into a plaster of paris mold.

The casting mix used to form a high purity, cast fused silica product in accordance with the present invention consists essentially of three principal ingredients: fused silica aggregate particles, typically having a particle size ranging from −10 to +20 mesh (U.S. standard), an aqueous slurry of fine (i.e., −325 mesh, U.S. standard) fused silica particles, and additional fused silica particles produced by drying a portion of the aqueous fused silica slurry and grinding the resultant dried particles.

In carrying out the method of the present invention, fused silica particles are subjected to wet grinding in water via conventional practice, typically in a ball mill, to produce an aqueous slurry of fine fused silica particles having a particle size less than about 325 mesh and having a water content less than about 20% by weight. A minor portion of the aqueous slurry of the fine fused silica particles is dried and the resultant dried fused silica particles are ground by dry milling such as in a bowl mill to break up any large aggregates formed during drying. Advantageously, the dried fused silica particles have an aggregate size less than 100 mesh (U.S. standard) after being milled. The other major portion of the aqueous slurry of the fine fused silica particles is admixed with the larger fused silica aggregate particles to form the basic casting mix to which the ground, dried fused silica particles are added in accordance with the present invention. The ground, dried fused silica particles are added to the admixture of fused silica aggregate and fine fused silica particle slurry prior to pouring. The resultant casting mix containing the ground, dried fine fused silica is poured into the mold, and is allowed to set for an adequate time. Then the resultant casting is removed from the mold, dried and sintered in accordance with conventional techniques and procedures well known in the art.

A refractory article produced in accordance with the method of the present invention exhibited a density of about 126 pounds per cubic foot and a porosity on the order of 7 to 8 percent. This refractory article was produced using a casting mix having the following content on a percent by wet weight basis:

Fine Fused Silica—- 45.7%
−10 to +2Mesh Fused Silica Aggregate—45.5%
Dried and Ground Fused Silica—8.7% Additionally, the casting mix had a water content of 8.9% percent by weight of the aqueous casting mix.

The above disclosed formulation is merely illustrative of a formulation for a casting mix which will result in a substantial increase in density and a substantial reduction in porosity in the resultant cast fused silica article when compared to articles produced from conventional fused silica mixes. Furthermore, excellent results may be obtained over a wide range of casting mix formulations consisting essentially of the three primary ingredients hereinbefore specified. Most advantageously, the casting mix used to carry out the method of the present invention will have a formulation on a dry weight basis formed of from about 40 to 50 percent fine fused silica particles, about 40 to about 50 percent of relatively larger fused silica aggregate, and from 5 to about 15 percent by weight of ground, dried fine fused silica particles. Preferably, the water content of the aqueous casting mix ranges from about 7.5 to about 9.5 percent by weight of the aqueous casting mix.

I claim:

1. In a method of producing a cast fused silica product wherein a flowable aqueous slurry of fine fused silica particles and a dry coarse fused silica aggregate are admixed and poured into a mold to form a cast product which is subsequently dried and sintered, the improvement comprising admixing additional fused silica particulate to the aqueous mixture of said fine fused silica slurry and said coarse fused silica aggregate to form a resultant aqueous casting mix prior to the pouring of the resultant aqueous casting mix into the mold, said additional fused silica particulate being added to the aqueous mixture of said fine fused silica slurry and said coarse fused silica aggregate to reduce the water content of the resultant aqueous casting mix to a water content ranging from about 7.5% to about 9.5% by weight, said additional fused silica particulate formed of dry agglomerates of fused silica particles having an agglomerated size less than about 100 mesh, said dry agglomerates of fused silica particles formed by drying an aqueous slurry having a water content less than about 20 percent by weight and including fine fused silica particles having a particle size ground to less than about 325 mesh, and dry grinding the resulting dried fused silica particles.

2. A method as recited in claim 1 wherein said additional fused silica particulate is added to the admixture of said fine fused silica slurry and said coarse fused silica aggregate in an amount so as to constitute from about 5 to 15 percent by weight of the resultant aqueous casting mix.

3. A method as recited in claim 1 wherein said coarse fused silica aggregate has a particle size range from greater than about 20 mesh to less than about 10 mesh.

4. A method as recited in claim 1 wherein said fine fused silica slurry has a water content less than about 20 percent by weight and includes fine fused silica particles having a particle size less than about 325 mesh.

5. A method as recited in claim 4 wherein said coarse fused silica aggregate has a particle size range from greater than about 20 mesh to less than about 10 mesh.

6. A method as recited in claim 5 wherein said resultant casting mmix comprises from about 40 to 50 percent by weight of said fine fused silica slurry from about 40 to 50 percent by weight of said coarse fused silica aggregate, and from about 5 to 15 percent by weight of said additional fused silica particles.

7. A high purity fused silica, flowable, aqueous casting mix for use in casting a fused silica product having a density greater than about 125 pounds/cubic foot and a porosity of less than 10 percent, said aqueous casting mix having a water content ranging from about 7.5% to about 9.5% by weight and comprising:
a. an aqueous slurry of fine fused silica particles having a particle size ground to less than about 325 mesh and having a water content less than about 20 percent by weight, said fine fused silica particles forming about 40 to 50 percent by weight of said casting mix on a dry basis;
b. particles of coarse fused silica aggregate, said fused silica aggregate particles having a particle size ranging from greater than about 20 mesh to less than about 10 mesh, said coarse fused silica aggregate particles forming about 40 to 50 percent by weight of said casting mix on a dry basis; and
c. particles of coarse fused silica formed by drying an aqueous slurry including fine fused silica particles having a particle size less than about 325 mesh and having a water content less than about 20 percent by weight, and grinding the resulting dried fused silica particles to an agglomerated size less than about 100 mesh, said particles of reground fused silica forming about 5 to 15 percent by weight of said casting mix on a dry basis.

8. A method of producing a cast fused silica product comprising the steps of:
grinding fused silica particles to have a first particle size and to form an aqueous slurry;
providing a fused silica aggregate having a second particle size greater than the first particle size;
drying a first amount of said aqueous slurry to form dried fused silica particles;
grinding said dried fused silica particles to have a third particle size intermediate to said first and second particle sizes; and
admixing a second amount of said aqueous slurry, said dry fused silica aggregate and said ground fused silica particles to form a casting mix.

9. The method of producing a cast fused silica product as recited in claim 8 wherein said ground fused silica particles are added to an admixture of said second amount of said aqueous slurry and said fused silica aggregate.

10. A method of producing a cast fused silica product as recited in claim 8 wherein said ground dried fused silica particles form about 5 to 15 percent by weight of said casting mix.

11. A method of producing a cast fused silica product as recited in claim 8 wherein said aqueous slurry has a water content less than about 20 percent by weight and includes particles having a particle size ground to less than about 325 mesh.

12. A method of producing a cast fused silica product as recited in claim 11 wherein said aqueous slurry is formed by wet grinding a slurry of fused silica particles.

13. A method of producing a cast fused silica product as recited in claim 8 wherein said ground dry fused silica particles include particles having an agglomerated particle size less than about 100 mesh.

14. A method of producing a cast fused silica product as recited in claim 8 wherein said aqueous slurry forms about 40 to 50 percent by weight of said casting mix.

15. A method of producing a cast fused silica product as recited in claim 8 wherein said dry fused silica aggregate forms about 40 to 50 percent by weight of said casting mix.

16. A method of producing a cast fused silica product as recited in claim 8 wherein said dry fused silica aggregate includes particles having an agglomerated particle size greater than about 20 mesh to less than about 10 mesh.

17. A method of producing a cast fused silica product as recited in claim 8 wherein the water content of said casting mix is about 7.5 to 9.5 percent by weight.

* * * * *

UNITED STATES PATENT AND TRADEMARK OFFICE
CERTIFICATE OF CORRECTION

PATENT NO. : 4,929,579
DATED : May 29, 1990
INVENTOR(S) : Perry B. Lassiter It is certified that error appears in the above-identified patent and that said Letters Patent is hereby corrected as shown below:

In claim 6, column 4, line 12, change "mmix" to --mix--;

In claim 8, column 4, line 56, delete "dry" and
       insert --dried-- after "ground";

In claim 9, column 4, line 59, insert --dried-- after "ground";

In claim 15, column 6, line 2, delete "dry";

In claim 16, column 6, line 6, delete "dry".

Signed and Sealed this

Twentieth Day of August, 1991

*Attest:*

HARRY F. MANBECK, JR.

*Attesting Officer*      *Commissioner of Patents and Trademarks*